United States Patent
Hirota et al.

[11] Patent Number: 5,299,016
[45] Date of Patent: Mar. 29, 1994

[54] TV RECEIVER WITH DEFORMABLE FRONT WINDOW OF CABINET FOR COMPENSATING FOR ASSEMBLY VARIATION

[75] Inventors: Narumi Hirota, Ibaraki; Toshiharu Hikida, Kyoto, both of Japan

[73] Assignee: Matsushita Electric Industrial Co., Ltd., Osaka, Japan

[21] Appl. No.: 779,510

[22] Filed: Oct. 18, 1991

[30] Foreign Application Priority Data

Oct. 31, 1990 [JP] Japan ................... 2-295754

[51] Int. Cl.⁵ .................................. H04N 5/65
[52] U.S. Cl. .................... 348/818; 348/822; 348/826
[58] Field of Search ............. 358/245–247, 358/254–255

[56] References Cited

U.S. PATENT DOCUMENTS

| | | |
|---|---|---|
| 4,360,838 | 11/1982 | Babicz et al. |
| 4,701,802 | 10/1987 | Omae et al. ................ 358/246 |
| 4,992,881 | 2/1991 | Tomasek et al. ............ 358/247 |
| 5,064,394 | 11/1991 | Swank ...................... 358/246 |
| 5,138,461 | 8/1992 | Kawamura et al. .......... 358/246 |

FOREIGN PATENT DOCUMENTS 1082031 12/1954 France .
61-147097 7/1986 Japan .

*Primary Examiner*—Stephen Brinich
*Attorney, Agent, or Firm*—Stevens, Davis, Miller & Mosher

[57] ABSTRACT

The present invention relates to a structure of positioning a cathode ray tube in a cabinet of a television receiver. In the television receiver, at least one portion of each of front window frames of the cabinet for positioning the cathode ray tube therein is formed as to be elastically deformable outwardly due to a contacting relationship between the cathode ray tube and the cabinet when assembling them. Because at least one portion of each of the front window frames is elastically deformed, a variation in a dimensional relationship between the cabinet and the cathode ray tube caused when securing the cathode ray tube to the cabinet can be compensated. Preferably, the front window frame is formed in such a manner that a thickness thereof is gradually reduced from the proximal end toward the free end.

4 Claims, 3 Drawing Sheets

TV RECEIVER WITH DEFORMABLE FRONT WINDOW OF CABINET FOR COMPENSATING FOR ASSEMBLY VARIATION

BACKGROUND OF THE INVENTION

1. Industrial Field of the Invention

The present invention relates to a television receiver (TV set) including a cathode ray tube and, more particularly, to a structure of attaching the cathode ray tube to a cabinet of the television receiver.

2. Description of the Prior Art

In recent years, there has been increased a demand for a large-sized color television receiver, and big receivers each having a display plane of 45 inches are manufactured and available. In such big receiver, a large cathode ray tube has to be directly secured to a cabinet of the receiver. A typical conventional structure of securing a cathode ray tube is shown in FIG. 5. The drawing 5 is a vertical cross-sectional view of a top portion of a television receiver provided with a cathode ray tube. In the drawing, a cabinet 3 includes a window A corresponding to a face (image display plane) 1a of a cathode ray tube 1. A boss 4 is integrally formed on an inner side of a portion of the cabinet surrounding the window A, i.e., a portion of the cabinet in contact with a peripheral edge portion of the face, and more briefly, a window frame 3a. The boss 4 projects from the inner side of the window frame 3a. At least rosidual three bosses of the same kind as the boss 4 are also provided at three portions of the window frame 3a. A metallic fixture bracket 2 of the cathode ray tube 1 is applied to a distal end of the boss 4 through a dimensional compensating member 6 and fixed to the boss 4 by means of a screw fastener 5. Another dimensional compensating member 7 is interposed between the window frame 3a and the cathode ray tube 1. In such a structure, a mutual positional relationship among the window frame 3a of the cabinet, the boss 4, the cathode ray tube 1 and the bracket 2 including the structure of attaching the fixture metal piece 2 to the cathode ray tube 1, may be variable. Thus, when the cathode ray tube 1 is secured to the cabinet 3, it is required to utilize the separate dimensional compensating members 6 and 7 in such a manner as to be shown in FIG. 5.

In the above-described structure which employs a plurality of separate dimensional compensating members, it is hard to assemble the receiver by a production machine automatically.

SUMMARY OF THE INVENTION

A primary object of the invention is to facilitate accommodation of a cathode ray tube into a cabinet of a television receiver.

In order to attain the object, the invention employs no separate dimensional compensating member to be interposed between the cabinet and the cathode ray tube.

According to a primary aspect of the invention relating to a television receiver, at least one portion of each of front window frames of a cabinet for accommodating a cathode ray tube therein is formed to be elastically deformable outwardly due to contact between the front frame and the cathode ray tube when assembling them. As a result, a variation in a dimensional relationship between the cabinet and the cathode ray tube when positioning the cathode ray tube in the cabinet can be compensated, thanks to elastic deformation of at least one portion of the front window frame.

One method of enabling at least one portion of the front window frame of the cabinet to be elastically deformable is to reduce a thickness of at least one portion of each of the front window frames. It is preferable to gradually reduce the thickness of each of the front window frames from the proximal portion of the frame in communication with a top wall, side walls and a bottom wall, respectively, of the cabinet to the free end.

It is also an effective means to provide a dimensional compensating member to the cabinet at a position where the front window frame is in contact with the cathode ray tube by integrally molding the dimensional compensating member with the cabinet main body, the member being formed from a rubber type elastomer resin and the like, for example, which is softer than the cabinet main body which is formed from a material of styrol plastic and the like. The integral molding (or insert molding) can be readily performed by previously positioning a dimensional compensating member in a mold cavity when the cabinet is manufactured from resin by an injection-molding process.

Other features of the invention may become more apparent from the following description with reference to the accompanied drawings.

DETAILED DESCRIPTION OF THE PREFERRED EMBODIMENT

Figure 1:
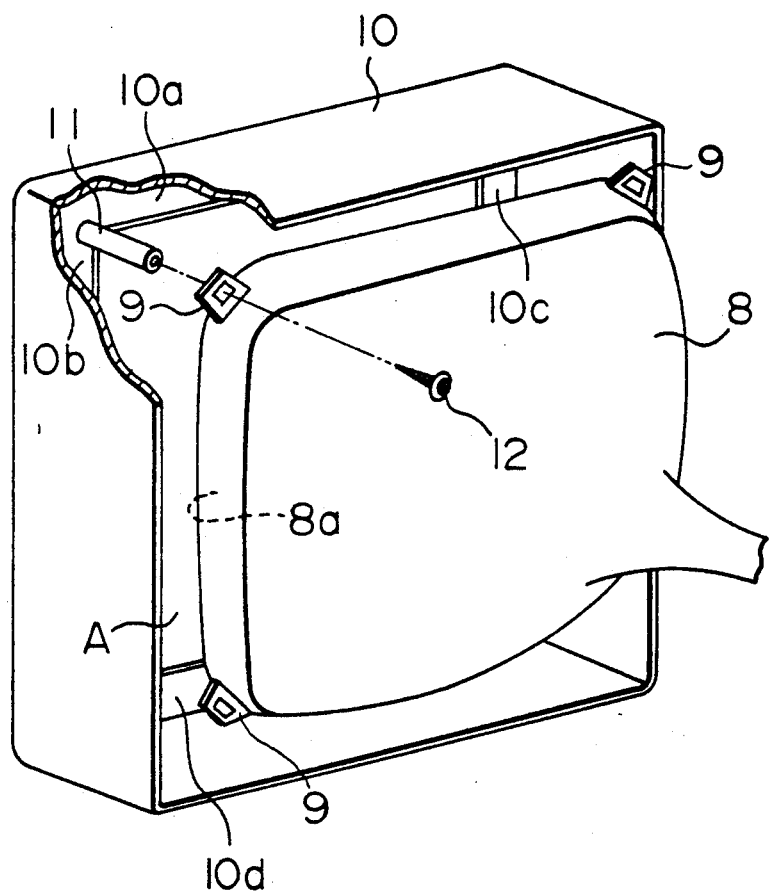
FIG. 1 is a fragmentary perspective view showing one embodiment of a television receiver according to the invention, as viewed from the back side thereof, illustrative of a state before a cathode ray tube is secured to a cabinet.

FIG. 1 is a partially exposed perspective view illustrative of a relation ship between a cabinet 10 of a television receiver and a cathode ray tube 8 which are to be assembled, as viewed from the back side thereof. Metallic fixing brackets 9 each having an opening for a fastener 12 are fixedly attached at four corner positions on side surfaces of the cathode ray tube 8. The cabinet 10 is a box-like body of which front and back faces are opened. The opened portion on the front face of the box-like body is a window A corresponding to a face 8a of the cathode ray tube 8. In this specification, wall portions of the cabinet surrounding the window A and in contact with a peripheral edge portion of the face 8a are defined as front window frames 10a, 10b, 10c, and 10d. Four bosses 11 for fixedly holding the cathode ray tube 8 are provided integrally with the cabinet 10 on inner surfaces of the front window frames so as to respectively correspond to four corners of the rectangular window A. Each boss 11 is a female thread member. The brackets 9 are applied to distal ends of the bosses 11 and screws 12 are engaged in female thread holes of the bosses 11, thereby securing the bracket 9 to the boss 11.

Figure 2:
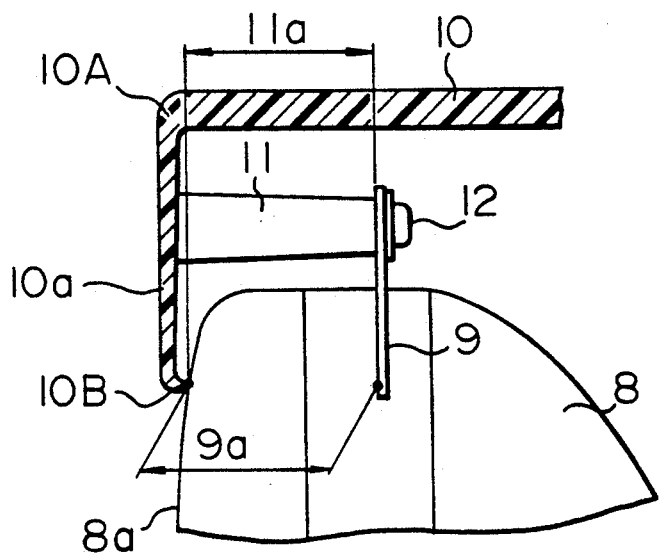
FIG. 2 is a vertical cross-sectional side view of a top portion of the television receiver, showing a state that the cathode ray tube is secured to the cabinet and that a front window frame of the cabinet is not deformed but is at a normal position.

Referring to FIG. 2, a thickness of the front window frame 10a is gradually reduced from the proximal end 10A in communication with a top wall of the cabinet 10 toward the free end 10B. It should be noted that the other frames 10b, 10c and 10d have the same form of thickness as the frame 10a. The form of the front window frame 10a assures relatively ready deformation of the front window frame 10a occurring elastically outwardly, in accordance with the object of the invention. FIG. 2 shows a state that the cathode ray tube 8 has already been assembled in the cabinet 10. The front window frame 10a is at a normal position where it is not elastically deformed. In FIG. 2, a height 11a from a horizontal position of the free edge 10B, regarded as a reference position, to a distal end position of the boss 11 is equal to an interval 9a between the horizontal position of the free edge 10B and the position of the bracket 9. In this state, the interval 9a has a required correct value such that a variation in a dimensional relationship between the bracket 9 and the cathode ray tube 8 is minimized.

Figure 3:
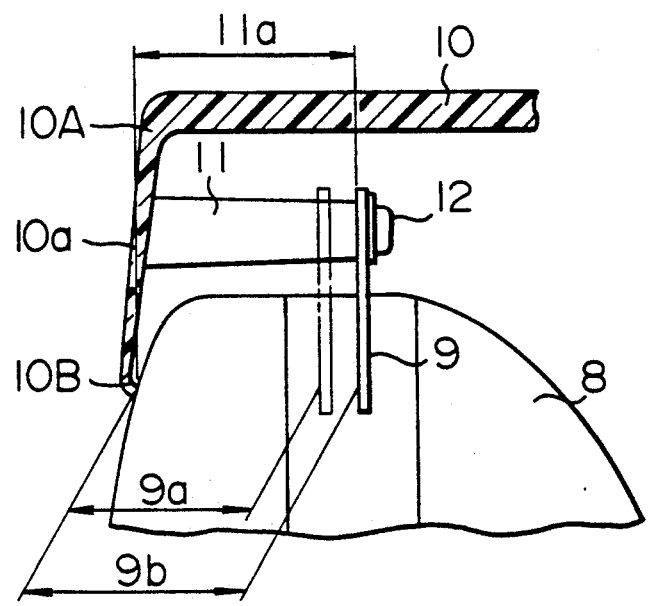
FIG. 3 is a view of the same portion of the television receiver as FIG. 2, illustrative of a state that the front window frame of the cabinet is elastically deformed.

FIG. 3 is a view similar to FIG. 2, but in the drawing, the bracket 9 is not correctly attached on the cathode ray tube 8, differently from FIG. 2. More specifically, the interval 9b between the horizontal position of the free edge 10B and the position of the bracket is larger than the above-described length 9a. Accordingly, the front window frame 10a is elastically deformed forwardly, that is, outwardly, by a distance corresponding to the difference (9b−9a). A variation of the position of the bracket 9 on the cathode ray tube 8 is compensated thanks to the elastic deformation of the front window frame 10a. When the front window frame 10a is obliquely deformed outwardly, the boss 11 provided on the front window frame 10a may be also inclined away from the horizontal direction, whereas it should be noted that state of the boss is not necessarily drafted correctly in the drawing.

Figure 4:
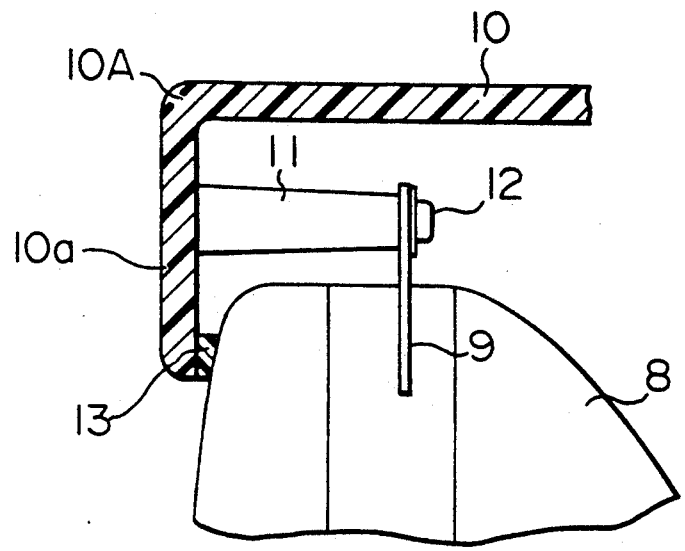
FIG. 4 is a cross-sectional partial side view showing a state that a dimensional compensating member is formed integrally with the cabinet on an inner side of the front window frame of the cabinet.
Figure 5:
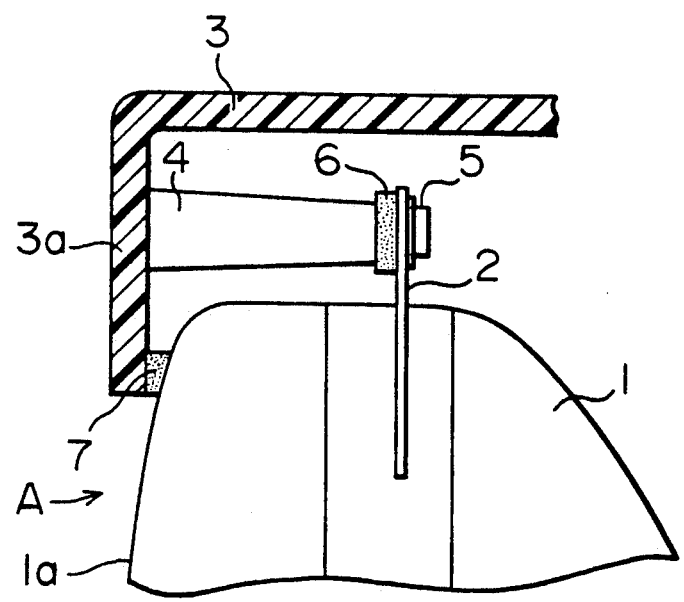
FIG. 5 is a vertical cross-sectional side view of a top portion of a conventional television receiver including a cathode ray tube.

FIG. 4 is a partial elevational section illustrative of a state that a dimensional compensating member 13 is formed integrally with the cabinet body 10 on the inner side of the front window frame 10a of the cabinet body 10, the dimensional compensating member being in a compressed condition. The dimensional compensating member 13 is molded integrally with the cabinet body during injection-molding the cabinet 11 of resin, and it may be regarded as one portion of the front window frame. The other front window frames have also a dimensional compensating member, respectively. Preferably, all dimensional compensating members may be formed integrally as one piece member.

The dimensional compensating member 13 is softer than the resin material of forming the cabinet, which dimensional compensating member compensates a variation of the position of the bracket on the cathode ray tube 8, thanks to elastic deformation of the dimensional compensating member 13.

As will be apparent from the above, according to the invention, it is possible to accommodate the cathode ray tube within the cabinet without separate dimensional compensating members to be interposed between the cabinet and the cathode ray tube.

What is claimed is:

1. A television receiver comprising a cabinet having a front window frame with a top section, a bottom section and two side sections for accommodating a cathode ray tube therein, wherein at least a portion of each of the top section, the bottom section and the two side sections is formed to be elastically deformable outwardly due to contact between the cathode ray tube and the cabinet when assembling them, and a variation in a dimensional relationship between the cabinet and the cathode ray tube caused by a variation of position of a fastener on the cathode ray tube is compensated by an elastic deformation of said at least one portion of each of the top section, the bottom section and the two side sections.

2. A television receiver according to claim 1, wherein at least part of each of the top section, bottom section and two side sections is reduced in thickness.

3. A television receiver according to claim 1, wherein a thickness of each of the top section, bottom section and two side sections is gradually reduced from the proximal portion in communication with a top wall, side walls and a bottom wall, respectively, of the cabinet toward the free end.

4. A television receiver according to claim 1, wherein a dimensional compensating member which is softer than a material of the cabinet body is provided at a position of the cabinet where each of the top section, bottom section and two side sections is in contact with the cathode ray tube, the dimensional compensating member being formed integrally with the cabinet body by molding.

* * * * *